United States Patent
Westerberg

(10) Patent No.: US 8,944,922 B2
(45) Date of Patent: Feb. 3, 2015

(54) SYSTEM AND METHOD FOR TRANSFERRING GAMING ELEMENTS BETWEEN PEER DEVICES

(75) Inventor: Johan Westerberg, Genarp (SE)

(73) Assignees: Sony Corporation, Tokyo (JP); Sony Mobile Communications AB, Lund (SE)

(*) Notice: Subject to any disclaimer, the term of this patent is extended or adjusted under 35 U.S.C. 154(b) by 0 days.

(21) Appl. No.: 13/806,192

(22) PCT Filed: Jan. 31, 2012

(86) PCT No.: PCT/IB2012/000139
§ 371 (c)(1),
(2), (4) Date: Dec. 21, 2012

(87) PCT Pub. No.: WO2013/114146
PCT Pub. Date: Aug. 8, 2013

(65) Prior Publication Data
US 2014/0031127 A1 Jan. 30, 2014

(51) Int. Cl.
*A63F 9/24* (2006.01)
*A63F 13/00* (2014.01)
(Continued)

(52) U.S. Cl.
CPC ........... *A63F 13/12* (2013.01); *H04M 1/72544* (2013.01); *A63F 2300/204* (2013.01); *A63F 2300/406* (2013.01); *A63F 2300/408* (2013.01); *A63F 2300/554* (2013.01); *H04M 2250/04* (2013.01); *A63F 2300/403* (2013.01); *A63F 2300/552* (2013.01)
USPC ............................................. 463/42; 463/40

(58) Field of Classification Search
CPC ..... A63F 13/00; A63F 13/12; A63F 2300/40; A63F 2300/403; A63F 2300/404; A63F 2300/405; A63F 2300/408; A63F 2300/50; H04W 4/008; H04L 29/06034
USPC ...................................................... 463/40–42
See application file for complete search history.

(56) References Cited

U.S. PATENT DOCUMENTS 7,970,350 B2   6/2011   Sheynman et al.
7,986,917 B2   7/2011   Ahlgren et al.
(Continued)

FOREIGN PATENT DOCUMENTS

WO   2009/141751 A1   11/2009
WO   2011/060991 A1   5/2011

OTHER PUBLICATIONS

International Search Report and Written Opinion of the International Searching Authority for corresponding International Application No. PCT/IB2012/000139 dated Oct. 12, 2012.

*Primary Examiner* — Milap Shah
(74) *Attorney, Agent, or Firm* — Renner, Otto, Boisselle & Sklar, LLP

(57) ABSTRACT

A portable communication device is equipped to transfer gaming elements stored on the portable communication device to a target electronic device. The portable communication device transfers user-defined gaming element transfer query to an electronic device via a near-field communications (NFC) module. The target electronic device receives one or more gaming elements from the portable communication device via the NFC module or a data object via the NFC module that enables the target electronic device to acquire the one or more gaming elements from a remote storage (e.g., a gaming server).

6 Claims, 5 Drawing Sheets

(51) Int. Cl.
*A63F 13/30* (2014.01)
*H04M 1/725* (2006.01)

(56) References Cited

U.S. PATENT DOCUMENTS

| | | | |
|---|---|---|---|
| 2006/0197669 A1* | 9/2006 | Wu et al. | 340/572.7 |
| 2007/0093294 A1* | 4/2007 | Serafat et al. | 463/39 |
| 2007/0111795 A1* | 5/2007 | Choi et al. | 463/42 |
| 2007/0167224 A1 | 7/2007 | Sprogis | |
| 2007/0239981 A1 | 10/2007 | Lessing | |
| 2008/0039212 A1* | 2/2008 | Ahlgren et al. | 463/46 |
| 2011/0016275 A1 | 1/2011 | Lemonnier et al. | |
| 2011/0112895 A1 | 5/2011 | Snyder | |
| 2011/0244964 A1* | 10/2011 | Glynne-Jones et al. | 463/40 |
| 2012/0077584 A1* | 3/2012 | Sarmenta | 463/31 |
| 2012/0077593 A1* | 3/2012 | Sarmenta | 463/40 |
| 2013/0267297 A1* | 10/2013 | Aligizakis et al. | 463/17 |
| 2013/0324237 A1* | 12/2013 | Adiraju et al. | 463/29 |

* cited by examiner

SYSTEM AND METHOD FOR TRANSFERRING GAMING ELEMENTS BETWEEN PEER DEVICES

This application is a national phase of International Application No. PCT/IB2012/000139 filed Jan. 31, 2012.

TECHNICAL FIELD OF THE INVENTION

The present invention relates generally to portable electronic devices, and, more particularly, to a system and method for transferring gaming elements between electronic devices.

DESCRIPTION OF RELATED ART

Portable communication devices, such as mobile phones, personal digital assistants, mobile terminals, etc., are becoming increasingly popular. As the popularity of portable communication devices continues to grow, today's wireless landscape is rapidly changing as mobile phones and networks are being enhanced to provide features and services beyond voice communications. The wireless industry is experiencing a rapid expansion of mobile data services. In addition, the features associated with certain types of portable communication devices have become increasingly diverse. To name a few examples, many portable communication devices have cameras, text messaging capability, Internet browsing functionality, electronic mail capability, video playback capability, audio playback capability, image display capability, gaming capability, position sensing capability and hands-free headset interfaces.

The widespread availability of portable communication devices has led to an increasing demand to place gaming applications on portable devices. One such type of game is a role-playing game in which a player will assume the role of a fictional character called an avatar that lives in an imaginary world. During the game the player controls the avatar to fight battles, search for treasure or weapons, or gain knowledge or experience. These actions or "quests" are typically governed by a system of formal rules and guidelines. However, players are usually free to improvise their actions within the rules. As a player successfully completes a quest, the player may be rewarded with points and is also permitted to progress through increasingly higher levels of the game.

Other types of games include a variety of sports-related games that offer players a chance to "own" or "manage" a sports team. Many games are designed to be played by multiple players, both competitively and cooperatively such as in team play. Players may join forces with other players to accomplish predetermined tasks, and/or to match their skills against other players to defeat other players and teams. For example, racing games and tactical warfare games have become popular.

With both single-player and multiple-player games, it is often desirable to share game elements among users of portable devices to enhance game play. Game elements may include, for example, different characteristics and game-related information such as skills, tools, knowledge, attributes, weapons, vehicles and experience acquired or lost during game play.

SUMMARY

To improve a user's ability to transfer or share gaming elements from one electronic device to another electronic device, the present disclosure describes a system and method that utilizes near field communication (NFC) for transferring gaming elements or features between two electronic devices.

One aspect of the invention relates to a method of transferring gaming elements to a target electronic device, the method including: receiving a transfer directive from a user; and wirelessly transmitting through a near field communication interface to the target electronic device at least one of (i) a gaming element and (ii) a data object that enables the target electronic device to acquire the gaming element from a remote data storage.

According to another aspect, the target electronic device includes a near field communications module.

According to another aspect, the wirelessly transmitting is performed using a portable communication device including a near field communications module.

According to another aspect, the wirelessly transmitting is performed via near field communication module while the portable communication device is in proximity to the target electronic device.

According to one aspect, the remote data storage from which the target electronic device acquires the gaming element is a remote server.

According to another aspect, the remote data storage from which the target electronic device acquires the gaming element is a cloud.

According to another aspect, the target electronic device is a mobile telephone.

Another aspect of the invention relates to a non-transitory machine-readable medium storing a program, the program being suitable for use in a portable communication device, wherein the program is loaded in memory in the portable communication device and execution causes the portable communication device to: wirelessly transmit a user-defined transfer query to a target electronic device via a near field communication link; and wirelessly transmit one or more gaming elements to the target electronic device.

According to one aspect, the wirelessly transmitting one or more gaming elements to the target electronic device is via near field communication link.

Another aspect of the invention relates to a portable communication device that includes a memory, a near field communication module and a controller that executes an application program in the memory, and execution causes the portable communication device to: wirelessly transmit a user-defined transfer query to a target electronic device via a near field communication link; and wirelessly transmit one or more gaming elements to the target electronic device.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended thereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

Figure 1:
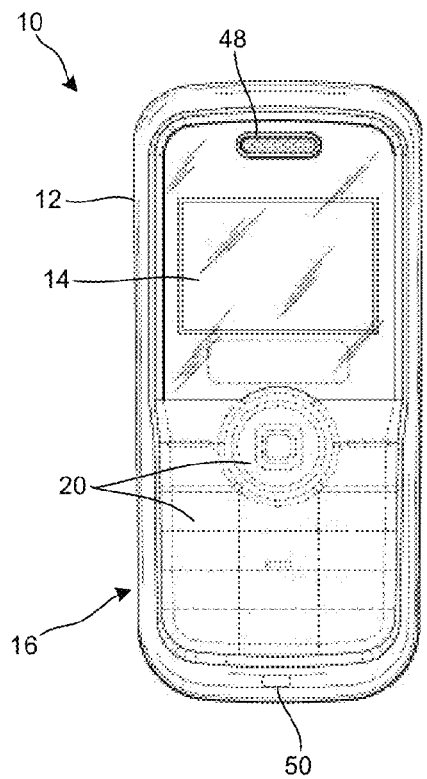
FIG. 1 is a diagrammatic illustration of a mobile telephone as an exemplary portable communication device.

In the detailed description that follows, like components have been given the same reference numerals regardless of whether they are shown in different embodiments of the present invention. To illustrate the present invention in a clear and concise manner, the drawings may not necessarily be to scale and certain features may be shown in somewhat schematic form.

As used herein, the term "portable communication device" includes portable radio communication equipment. The term "portable radio communication equipment", which herein after may be referred to as a mobile phone, a mobile device, a mobile radio terminal or a mobile terminal, includes all electronic equipment, including, but not limited to, mobile telephones, pagers, communicators, i.e., electronic organizers, smartphones, personal digital assistants (PDAs), or the like. While the present invention is being discussed with respect to portable communication devices, it is to be appreciated that the invention is not intended to be limited to portable communication devices, and can be applied to any type of electronic equipment capable of being used for voice and/or data communication, e.g., a near-field communications (NFC)-enabled communication device.

In addition, as used herein the terms "electronic device" and "target electronic device" include portable radio communication equipment. The term "portable radio communication equipment", which hereinafter may be referred to as a mobile phone, a mobile device, a mobile radio terminal or a mobile terminal, includes all electronic equipment, including, but not limited to, mobile telephones, pagers, communicators, i.e., electronic organizers, smartphones, personal digital assistants (PDAs), or the like. While the present invention is being discussed with respect to portable communication devices, it is to be appreciated that the invention is not intended to be limited to portable communication devices, and the terms "electronic device" and "target electronic device" include any type of electronic equipment on which gaming elements are stored, e.g., a personal computer or media server.

As used herein, the term "gaming element" includes features or game-related information such as such as skills, tools, knowledge, attributes, weapons, vehicles, experience and any other characteristics that a player may acquire or lose during game play. In one embodiment, the game element is an attribute that is acquired by a player when the player reaches a higher level within a game. For example, a player may be rewarded with enhanced features such as more powerful weapons, a faster car, or other advantages as the player advances to a particular higher level or accomplishes a certain goal within the game.

In an exemplary embodiment of the method described herein, two people are playing the same game on their respective portable communication devices. Player 1 is playing on a higher level within the game and has acquired more advanced equipment than player 2, who is player on a lower level within the game. Player 1 may be willing to share some of his advanced equipment (his "gaming elements") with player 2 so that player 2 can enjoy more advanced features and equipment in the game and/or advance to the same level as that of player 1. With the method described herein, player 1 can share or transfer gaming elements to player 2 by simply placing his electronic device in close proximity to the electronic device of player 2 to transfer one or more gaming elements via a near field communication (NFC) link.

Figure 2:
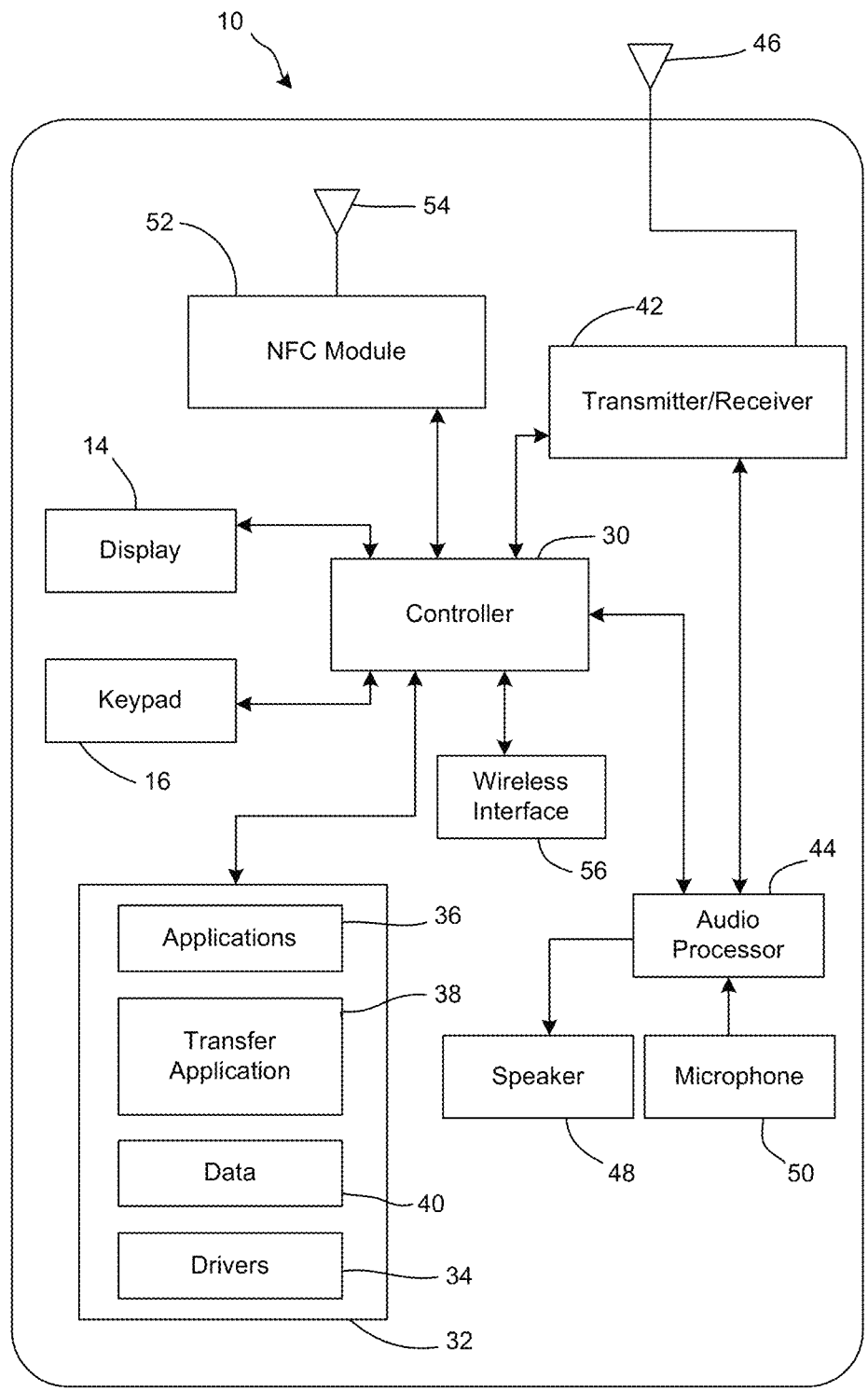
FIG. 2 is a diagrammatic illustration of a portable communication device in accordance with aspects of the present invention.

Referring initially to FIG. 1 and FIG. 2, an exemplary embodiment of a portable communication device 10, e.g., a mobile phone, mobile terminal or the like, is depicted. As is described more fully below, the portable communication device 10 includes a transfer application (e.g., an application program, code or logic routine that is executed by the portable communication device) and a wireless interface device (e.g., a near-field communication (NFC) module that enables transfer of gaming elements to a target electronic devices such as other portable communication devices, personal computers, media servers or the like). In addition, the target electronic device may execute an application program or other logic routine comprising hardware and software operations to support a transfer function and to return a response to a received transfer query.

Stated differently, the portable communication device 10 supports a gaming element transfer application by including hardware and/or application program appropriate for transferring one or more gaming elements to a target electronic device. For purposes of the discussion herein, portable communication device 10 will be described in terms of wirelessly transmitting a transfer query to a target electronic device and receiving a response from the target electronic device to initiate a wireless transfer of gaming elements to the target electronic device.

The portable communication device in the illustrated embodiments is a mobile telephone, and may be referred to as the mobile telephone 10. As indicated, the description and illustrations of a mobile telephone for the portable communication device are intended to serve as a non-limiting exemplary environment for the inventive concepts described herein. The mobile telephone 10 is shown as having a "brick" or "block" form factor housing 12, but it will be appreciated that other types of housings, such as a clamshell housing or a slide-housing, may be utilized.

The mobile telephone 10 includes a display 14 and keypad 16. As is conventional, the display 14 displays information to a user, such as operating state, time, telephone numbers, contact information, various navigational menus and the like, which enable the user to utilize the various features of the mobile telephone 10. The display 14 also may be used to visually display content received by the mobile telephone 10 and/or retrieve from a memory 32 (FIG. 2) of the mobile telephone 10.

Similarly, the keypad 16 may be conventional in that it provides for a variety of user input operations. For example, the keypad 16 typically includes alphanumeric keys 20 for facilitating entry of alphanumeric information, such as telephone numbers, phone lists, contact information, notes and the like. In addition, the keypad 16 typically includes special function keys, such as a "call send" key for initiating or answering a call, and a "call end" key for ending or "hanging up" a call. Special function keys also may include menu navigation keys, for example, for navigating through a menu displayed on the display to select different telephone functions, profiles, settings, etc., as is conventional. Other keys associated with the mobile telephone may include a volume key, an audio mute key, an on/off power key, a web browser launch key, a camera key and the like. Keys or key-like functionality also may be embodied as a touch screen associated with the display 14. While some embodiments of the transfer application may not involve keypad-based user interaction with the mobile telephone 10, other embodiments may include keypad interaction with the transfer application, such as entering transfer query, setting up various other options, data selection and the like.

The mobile telephone 10 includes conventional call circuitry that enables the mobile telephone 10 to establish a call or otherwise exchange signals with a call/calling device, typically another mobile telephone, landline telephone or other electronic device. However, the call/calling device need not be another telephone, but may be some other device, such as an Internet web server, content providing server, media server or the like. The call circuitry also may be responsible for transmitting text messages that are prepared by the user.

FIG. 2 represents a functional block diagram of a portable communication device 10. The portable communication device 10 includes a controller 30 that controls the overall operation of the portable communication device. The controller 30 may include any commercially available or custom microprocessor or microcontroller. Memory 32 is operatively connected to the controller 30 for storing control programs and data used by the portable communication device. The memory 32 is representative of the overall hierarchy of memory devices containing software and data used to implement the functionality of the portable communication device in accordance with one or more aspects described herein. The memory 32 may include, for example, RAM or other volatile solid-state memory, Flash or other non-volatile solid-state memory, a magnetic storage medium such as a hard disk drive, a removable storage media, or other suitable storage means. In addition to handling voice communications, the portable communication device 10 may be configured to transmit, receive and process data, such as text messages (also known as SMS), electronic mail messages, multimedia messages (also known as MMS), image files, video files, audio files, ring tones, streaming audio, streaming video, data feeds (e.g., podcasts) and so forth.

In the illustrated embodiment, memory 32 stores drivers 34 (e.g., I/O device drivers), application programs 36, including one or more gaming applications, a transfer application program 38, and application program data 40. The I/O device drivers include software routines that are accessed through the controller 30 (or by an operating system (not shown) stored in memory 32) by the application programs, including the transfer application program 38, to communicate with devices such as the display 14 and other input/output ports.

The application programs, including the transfer application program 38, comprise programs that implement various features of the portable communication device 10, such as voice calls, e-mail, Internet access, contact manager, gaming and the like. As is described more fully below, the transfer application program 38 comprises a program, logic routine or code that enables the user of the portable communication device to transfer one or more gaming elements stored on the portable communication device to a target electronic device.

A person having ordinary skill in the art of computer programming, and specifically in applications programming for mobile phones, will consider it obvious in view of the description provided herein how to program a mobile phone to operate and carry out the functions described herein with respect to the transfer application 38 (and any interfacing between the transfer application program 38 and other application programs, e.g., gaming application programs, messaging application programs, media application programs and the like). Accordingly, details as to the specific programming code have been left out. Also, while the transfer functionality is carried out via the controller 30 and transfer application 38 (alone or in conjunction with other application programs) in memory 32 in accordance with inventive aspects, such function also could be carried out via dedicated hardware, firmware, software or combinations thereof without departing from the scope of the present invention.

With continued reference to FIG. 2, the controller 30 interfaces with the aforementioned display 14 and keypad 16 (and any other user interface device), a transmitter/receiver 42 (often referred to as a transceiver), audio processing circuitry, such as an audio processor 44, and a position determination element (not shown), such as a global positioning system (GPS) receiver.

An antenna 46 is coupled to the transmitter/receiver 42 such that the transmitter/receiver 42 transmits and receives signals via antenna 46, as is conventional. The portable communication device includes an audio processor 44 for processing the audio signals transmitted by and received from the transmitter/receiver. Coupled to the audio processor 44 are a speaker 48 and microphone 50, which enable a user to listen and speak via the portable communication device. Audio data may be passed to the audio processor 44 for playback to the user. The audio data may include, for example, audio data from an audio file stored in the memory 32 and retrieved by the controller 30. The audio processor 44 may include any appropriate buffers, decoders, amplifiers and the like.

In the illustrated embodiment, the portable communication device 10 also includes a near-field communication (NFC) module 52 (also referred to as an NFC chipset, an NFC transceiver, an NFC interface, an NFC adaptor or the like) or other comparable communication components (e.g., a close-proximity data transceiver) to establish a localized communication link with a compatible component of another device (e.g., a target electronic device or portable communication device, when the devices are brought in relatively close proximity to each other). The term NFC generally is used to refer to a magnetic-field induction communication interface and protocol that was jointly developed by Sony and Phillips and which has been adopted as standard by ECMA (ECMA-340) and ISO/IEC (ISO/IEC 18092). The NFC module 52 is coupled to or otherwise includes a NFC coupler 54, e.g., including an inductor or coil in the form of an antenna. NFC generally has a working distance of about 0 centimeters to several tens of centimeters (or more). NFC may be used in a passive communication mode where an initiator device provides a carrier field and that is answered by modulating the existing field with a transponder, which may draw operating power from the initiator-provided electro-magnetic field. NFC also may be used in an active communication mode where both the initiator and transponder communicates by generating their own fields in, in which case, both the initiator and transponder typically receive power from a power supply. NFC may be used to configure and initiate another wireless network connection or interface between devices, such as Bluetooth and WiFi connections.

As will be appreciated, the illustration and description of an NFC module 52 is meant to be an example of a close-proximity communication device and any appropriate device to establish a localized communication link may be used and may include devices that rely on a capacitive coupling technique, a propagating wave, e.g., electromagnetic, technique, a radio frequency transmission technique, e.g., such as the techniques used for RF identification (RFID) devices, a magnetic field induction technique or any other appropriate techniques.

The portable communication device also may include one or more local wireless interfaces (indicated generally as wireless interface 56), such as an infrared transceiver and/or an RF adapter, e.g., a Bluetooth adapter, WLAN adapter, WiFi adapter and the like, for establishing communication with an accessory, a hands free adapter, e.g., a headset that may audibly output sound corresponding to audio data transferred from the portable communication device 10 to the adapter, another mobile radio terminal, a computer, or any other electronic device. As will be appreciated, the local wireless interface 56 may be used to transmit data, e.g., a user-defined transfer query, from the portable communication device 10 when the portable communication device functions as an originating device during a transfer operation, and receives data from another device (e.g., a target electronic device) when the portable communication device functions as a target for a gaming element transfer operation.

Figure 3:
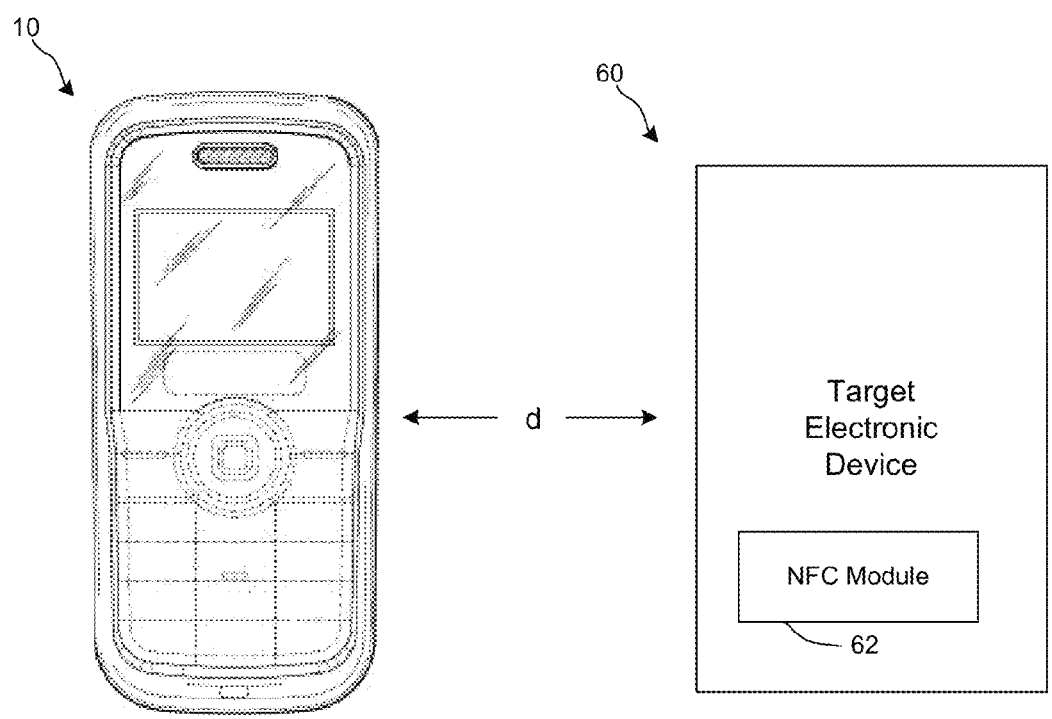
FIG. 3 is a diagrammatic illustration of a portable communication device in proximity to an electronic device.

With reference now to FIG. 3, aspects of the method, device and system described herein will be described with respect to a portable communication device 10 that transfers gaming elements stored on the portable communication device 10 to a target electronic device 60, e.g., a portable communication device, a personal computer, a media server or the like, when the portable communication device 10 is in proximity to the target electronic device 60. The target electronic device 60 includes an NFC module 62 that is capable of performing near-field communication with the portable communication device 10 (via the NFC module coupled to the portable communication device).

As one of ordinary skill in the art will appreciate, NFC means and includes communication that can be accomplished when the portable communication device 10 and the target electronic device 60 are "in proximity" or "in relative proximity," e.g., within a distance "d" of one another, where distance "d" is between 0 centimeters and several tens of centimeters (including when the housings of the portable communication device 10 and the target electronic device 60 are in contact with one another).

Figure 4:
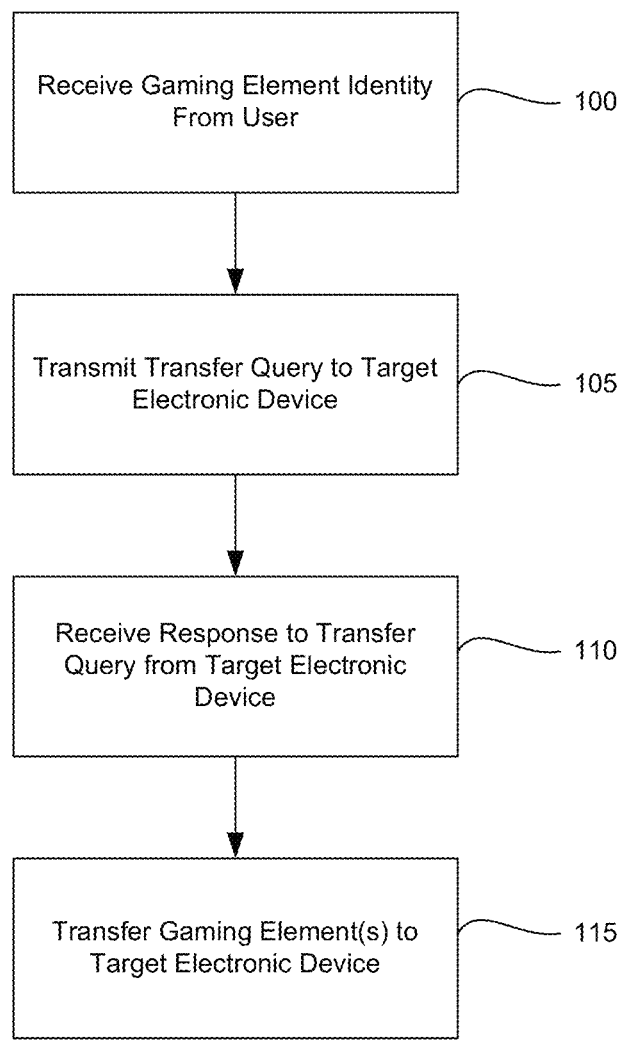
FIG. 4 is a flow chart or functional diagram representing a method of transferring gaming elements to a target electronic device in accordance with aspects of the present invention.
Figure 5:
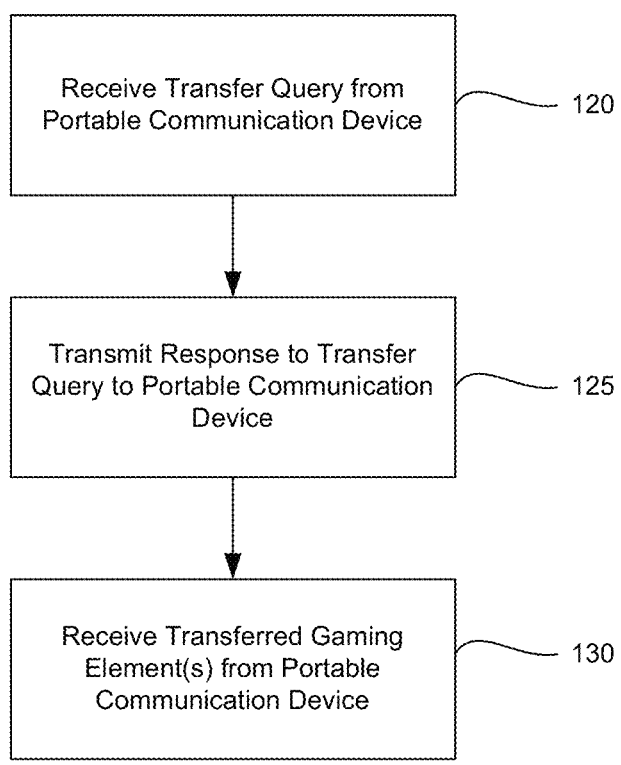
FIG. 5 is a flow chart or functional diagram representing a method of receiving gaming elements from a portable communication device in accordance with aspects of the present invention.
Figure 6:
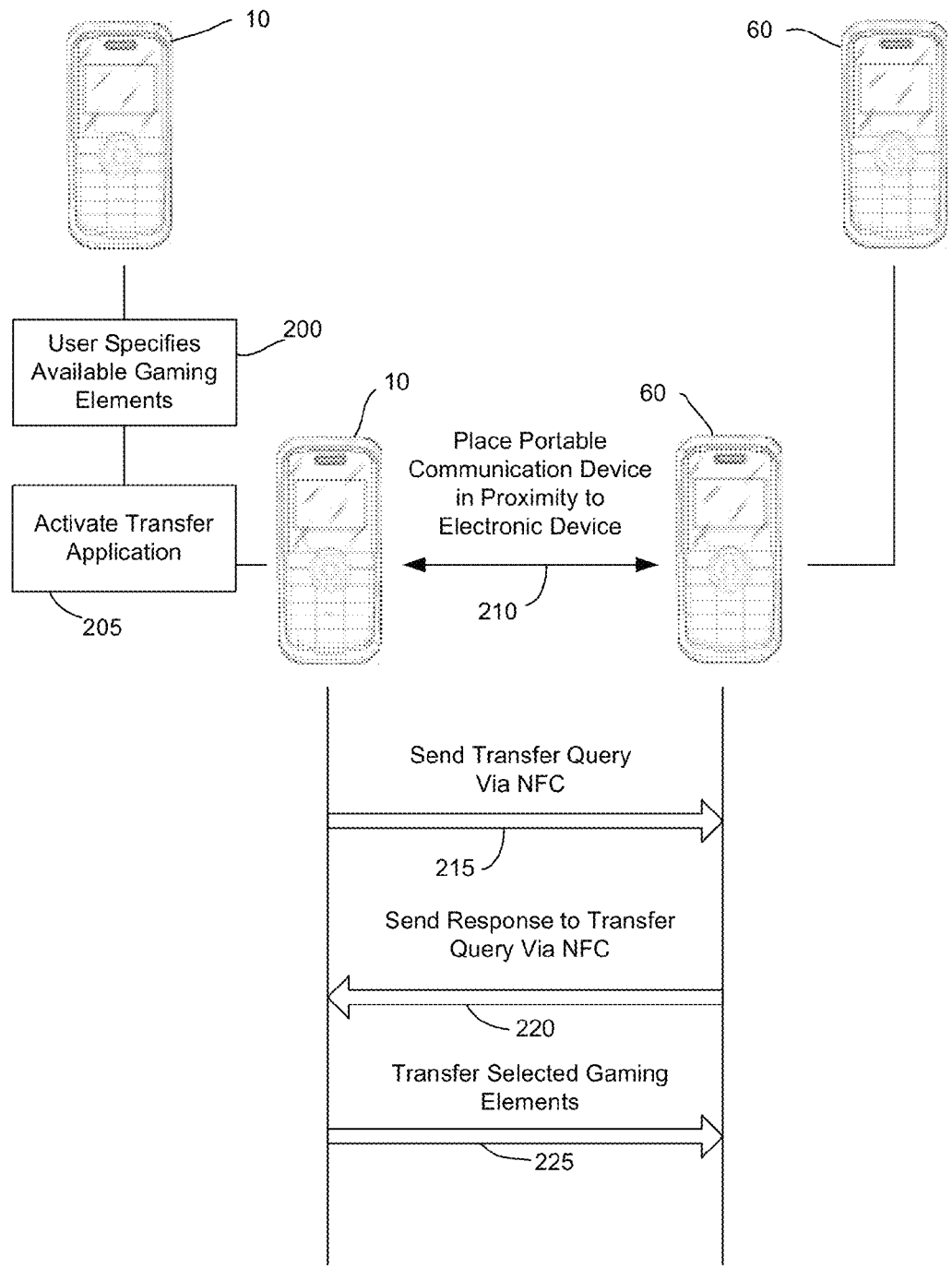
FIG. 6 is a flow chart or functional diagram representing the relevant operation of a portable communication device in accordance with aspects of the present invention.

While for purposes of simplicity of explanation, the flow charts or diagrams in FIGS. 4-6 include a series of steps or functional blocks that represent one or more aspects of the relevant operation of the portable communication device 10 and/or the target electronic device 60. It is to be understood and appreciated that aspects of the invention described herein are not limited to the order of steps or functional blocks, as some steps or functional blocks may, in accordance with aspects of the present invention occur in different orders and/or concurrently with other steps or functional blocks from that shown or described herein. Moreover, not all illustrated steps or functional blocks of aspects of relevant operation may be required to implement a methodology in accordance with an aspect of the invention. Furthermore, additional steps or functional blocks representative of aspects of relevant operation may be added without departing from the scope of the present invention.

The methodologies illustrated in FIGS. 4-6 relate to using a short-range communication interface, e.g., a near-field communication (NFC) interface to conduct gaming element transfers between two devices, e.g., between a transferring portable communication device and a target electronic device. Turning now to FIG. 4, a method of sharing one or more gaming elements stored on a portable communication device begins at functional block 100 where the portable communication device (sometimes referred to herein as the transferring portable communication device) receives a transfer directive from a user of the portable communication device. For example, a user of the portable communication device may activate the transfer application and enter or otherwise specify the identity of one or more gaming elements to be shared, e.g., by selecting metadata of one or more gaming files that are stored on the user's portable communication device, (e.g., enhancements associated with a specified game level, tools, attributes, weapons, skills, or the like acquired by the user during game play) or by manually entering a transfer query into the portable communication device, for example, using the keypad (e.g., "unlock level 6"). At functional block 105, the user-defined transfer query is wirelessly transmitted to the target electronic device. In a preferred embodiment, the wireless transfer of the user-defined transfer query includes transmittal of the transfer search query via an NFC link between the portable communication device and the target electronic device once the portable communication device and the target electronic device are in close proximity to one another (e.g., a sufficiently close distance for conducting near-field communications).

At functional block 110, the portable communication device receives a response to the transfer query from the target electronic device. In a preferred embodiment, the wireless receiving of the query response from the target electronic device is accomplished via an NFC link between the target electronic device and the portable communication device. The received query response can be displayed to the user of the transferring portable communication device in any appropriate format. In one embodiment, after the query response from the target electronic device has been received by the portable communication device, a visual, auditory and/or tactile signal or other indication may be given to the user of the transferring portable communication device (as well as the user of the target electronic device in an embodiment where the target electronic device is another portable communication device).

At functional block 115, the portable communication transfers or otherwise transmits the gaming element(s) to the target electronic device, for example, via the NFC link between the target electronic device and the portable communication device. Of course, another wireless interface could be used for transfer of the gaming element(s) to the target electronic device without departing from the scope of the present invention. Optionally, after the transfer of gaming elements is complete, an indication, e.g., a visual, auditory and/or tactile signal, may be given to users of one or both of the portable communication device and the electronic device on which the gaming element is received.

In one embodiment of the method of sharing gaming elements, a data object that enables the target electronic device to acquire the gaming element from a remote data storage is wirelessly transmitted through a NFC link to the target electronic device. The remote data storage may be, for example a remote server such as a gaming server, or it may be a cloud.

Referring now to FIG. 5, a method of receiving gaming elements, (e.g., enhancements associated with a specified game level, tools, attributes, weapons, skills, or the like acquired during game play) from a remote portable communication device, e.g., a mobile phone, begins at functional block 120 where an electronic device, e.g., a portable communication device, a personal computer, a media server or the like, receives a transfer query from a remote portable communication device. In a preferred embodiment, the transfer query from the remote portable communication device is received via an NFC link between the remote portable communication device on which the gaming element is stored and the electronic device. As is discussed above, the remote portable communication device can be in relative proximity to (e.g., within a range of 10 centimeters) or even in physical contact with the electronic device, such as the housings touching one another. The received transfer query can be made up of the identity of one or more gaming elements stored on the remote portable communication device available to be shared, such as a number of key terms, metadata terms or other relevant information for a transfer query.

At functional block 125, the electronic device transmits a response to transfer query indicating whether the specified gaming elements are to be transferred, and optionally, which of the specified gaming elements are to be transferred. In other words, the electronic device may accept all of the available gaming elements identified in the transfer query, or may accept a subset of all of the gaming elements identified as being available for sharing by the remote portable communication device. Of course, the electronic device has the option of rejecting the transfer query, for example, in response to a user of the electronic device automatically selecting a reject transfer query option and/or by providing the user of the electronic device with the option of rejecting or otherwise refusing a transfer query after the transfer query is received by the electronic device.

At functional block 130, the electronic device receives the transferred gaming element(s) from the remote portable communication device, where the gaming elements include those identified in the response to the previously transmitted transfer query. In a preferred embodiment, the wireless receiving of the gaming elements from the remote portable communication device is accomplished via the NFC link between the electronic device and the portable communication device. Of course, another wireless interface could be used for transfer of the gaming elements to the electronic device without departing from the scope of the present invention. Optionally, after the transfer of gaming elements is complete, an indication, e.g., a visual, auditory and/or tactile signal, may be given to users of one or both of the portable communication device on which the gaming elements are stored and the electronic device.

In one embodiment of method of receiving gaming elements, a data object that enables the target electronic device to acquire the gaming element from a remote data storage is wirelessly transmitted through a NFC link to the target electronic device. The remote data storage may be, for example a remote server such as a gaming server, or it may be a cloud.

With reference now to FIG. 6, a method of sharing gaming elements between a pair of devices is provided in the illustrated exemplary embodiment. The method will be described with respect to gaming element sharing between a pair of portable communication devices 10 and 60 where the portable communication device 10 is representative of a transferring device, e.g., a device transferring gaming elements to a target electronic device 60. While the target electronic device 60 is illustrated and will be described as a portable communication device, it will be appreciated that the method device and system described herein is applicable to any sort of electronic device, including, but not limited to portable communication devices, personal computers, media servers and the like.

At functional block 200, the user of portable communication device 10 specifies the gaming elements available for transfer in the form of a transfer query. The user of portable communication device 10 may specify any suitable transfer query for the available gaming element(s), such as by selecting metadata of one or more media files that are stored on the user's portable communication device, e.g., enhancements associated with a specified game level, tools, attributes, weapons, skills, or the like acquired by the user during game play, or by manually entering a transfer query into the portable communication device. At functional block 205, the user of portable communication device 10 activates the transfer application. At functional block 210, portable communication device 10 and target electronic device 60 are placed in proximity to one another. As is described above, portable communication device 10 and target electronic device 60 are in proximity to one another when they are within a given distance of one another (e.g., a distance of 10 centimeters or less), such that an NFC session may be established. For purposes of the discussion contained herein, two devices being in proximity with one another is meant to include when the housings of the two devices are in contact with one another. Further, the devices may be further apart than the exemplary proximity range specified herein, depending on the strength, nature or type of the wireless interface used for communication between the two devices. It will be appreciated that functional block 210, which is representative of placing the portable communication device 10 in proximity to target electronic device 60, may take place before or after the steps or actions recited in connection with functional block 200 and 205.

At functional block 215, the transfer query is wirelessly transmitted from portable communication device 10 to target electronic device 60 by way of an NFC link between portable communication device 10 and target electronic device 60. At functional block 220, the target electronic device 60 responds to the transfer query via NFC. The user of target electronic device 60 has the option of selecting one or more gaming elements identified within the transfer query to be transferred or otherwise copied from portable communication device 10 to target electronic device 60. By way of example, the user of portable communication device 10 may browse the identified gaming elements and optionally select one or more elements to be retrieved from portable communication device 10.

Once the user of the target electronic device 60 selects desired gaming elements to be transferred, the portable communication device will transfer (e.g., via a NFC link) the gaming elements to the target electronic device. Optionally, the response to the transfer query will be accompanied by information enabling the target electronic device 60 to establish a separate communication link with the portable communication device for transfer of the selected gaming elements from the portable communication device 10 to target electronic device 60. (see functional block 225 below). Alternatively, target electronic device 60 may send a request (e.g., in functional block 220) for information related to establishing a separate communication link. Examples of such information may include the ID or address used by the target electronic device 60 in the other link to be established (e.g., WLAN MAC address) and authentication or security information.

At functional block 225, the selected gaming elements may be transferred from portable communication 10 to target electronic device 60 by an NFC link. In one embodiment, portable communication device 10 initiates the transfer by utilizing another wireless interface, e.g., Bluetooth, WLAN or the like.

It will be appreciated that the method steps or functional blocks described above may occur during one continuous session between portable communication device 10 and target electronic device 60. Alternatively, the portable communication device 10 and target electronic device 60 may be kept in proximity to one another until functional block 215 or 220, where the transfer query is transferred from portable communication device 10 to target electronic device 60 via NFC, and a response is sent from the target electronic device to the query, followed by a gap of time, for example, where the user of portable communication device 10 removes the device from the proximity relationship to target electronic device 60, and returns his/her portable communication device 10 to proximity with target electronic device 60 at a later time. In this exemplary embodiment, portable communication device 10 would transfer the selected gaming elements (functional block 225) once the portable communication device 10 was returned to proximity with target electronic device 60. One application of this exemplary embodiment may include a situation where the user of portable communication device 10 has a short visit with a friend who is in possession of target electronic device 60. In this situation, the transfer queried by the user of portable communication device 10 may be transferred to target electronic device 60 followed by a period of time where the users of portable communication device 10 and target electronic device 60 are apart. Subsequently, the users of portable communication device 10 and target electronic device 60 may again visit one another, for example, during a lunch break or other visiting situation. At which point, the remainder of the functional blocks illustrated in FIG. 6 may be carried out by portable communication device 10 and/or target electronic device 60.

It will be appreciated that a portable communication device having remote content searching functionality provides the user with the capability of conveniently and efficiently searching for specified content or any content stored on the electronic device of a friend. Further, the remote content searching method and device described herein may be employed in connection with a user of the portable communication device searching and/or downloading content from a fixed source, e.g., a personal computer or a fixed media server.

As will be appreciated by one of skill in the art, computer program elements and/or circuitry elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method of transferring gaming elements from a transferring portable electronic device to a target portable electronic device, the method comprising:

receiving a transfer directive from a first user operating the transferring portable electronic device or a second user operating the target portable electronic device; and wirelessly transmitting from the transferring portable electronic device, through a near field communication interface, to the target portable electronic device at least one of (i) a gaming element and (ii) a data object that enables the target portable electronic device to acquire the gaming element from a remote data storage, wherein, the transferring portable electronic device and the target portable electronic device are both configured to facilitate play of a common multi-level video game, with the first user of the transferring portable electronic device playing the multi-level video game at a higher or more advanced level than the second user of the target portable electronic device;

wherein, the gaming element comprises at least one of a skill, a tool, knowledge, a weapon, a vehicle, experience acquired or lost during play of the multi-level video game, or an ability to unlock one or more levels of the multi-level video game;

wherein the gaming element is initially acquired by the first user of the transferring portable electronic device through skillful play of the multi-level video game at the higher or more advanced level; and wherein the wireless transmission of the gaming element assists the second user of the target portable electronic device in more quickly advancing to the higher or more advanced level as that of the first user of the transferring portable electronic device at a faster rate with the wireless transmission of the gaming element than without the wireless transmission of the gaming element.

2. The method of claim 1 wherein the target portable electronic device includes a near field communications module.

3. The method of claim 1 wherein the remote data storage is a remote server.

4. The method of claim 1 wherein the remote data storage is a cloud data storage.

5. The method of claim 1 wherein the target portable electronic device is a mobile telephone.

6. A non-transitory machine-readable medium storing a program, the program being executable on a transferring portable communication device, wherein the program is stored in a memory device of the transferring portable communication device and execution of the program causes the transferring portable communication device to:

receive a transfer directive from a first user operating the transferring portable communication device or a second user operating a target portable communication device; and wirelessly transmit from the transferring portable communication device, through a near field communication link, to the target portable communication device at least one of (i) a gaming element and (ii) a data object that enables the target portable communication device to acquire the gaming element from a remote data storage, wherein, the transferring portable communication device and the target portable communication device are both configured to facilitate play of a common multi-level video game, with the first user of the transferring portable communication device playing the multi-level video game at a higher or more advanced level than the second user of the target portable communication device;

wherein, the gaming element comprises at least one of a skill, a tool, knowledge, a weapon, a vehicle, experience acquired or lost during play of the multi-level video game, or an ability to unlock one or more levels of the multi-level video game;

wherein the gaming element is initially acquired by the first user of the transferring portable communication device through skillful play of the multi-level video game at the higher or more advanced level; and wherein the wireless transmission of the gaming element assists the second user of the target portable communication device in more quickly advancing to the higher or more advanced level as that of the first user of the transferring portable communication device at a faster rate with the wireless transmission of the gaming element than without the wireless transmission of the gaming element.

\* \* \* \* \*